Dec. 5, 1939.   R. G. JACOBSON   2,182,478
BORING HEAD
Filed Dec. 21, 1938
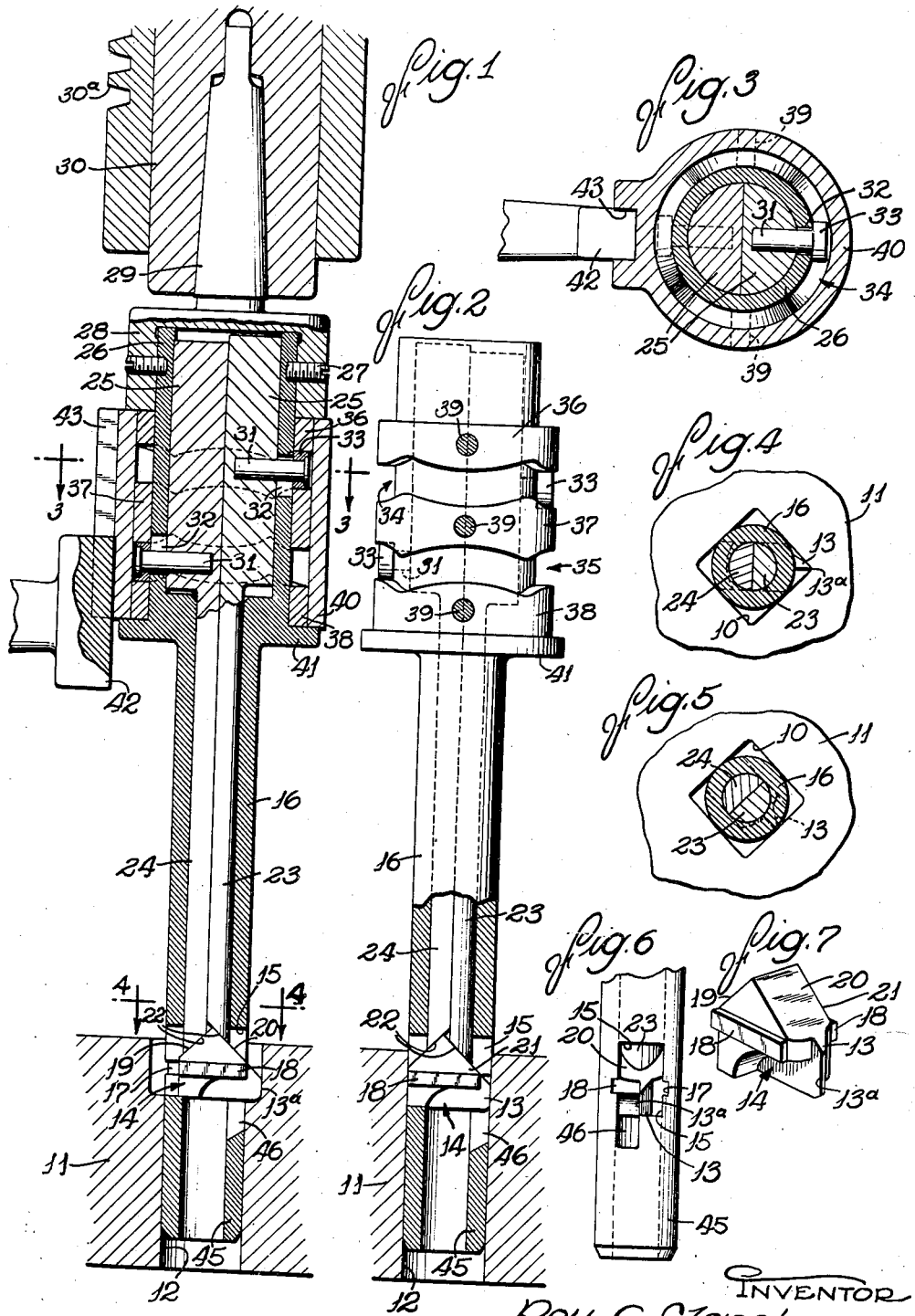
INVENTOR
Roy G. Jacobson
By Parker, Carlson, Pitzner & Hubbard
ATTORNEYS Patented Dec. 5, 1939

2,182,478

UNITED STATES PATENT OFFICE 2,182,478

BORING HEAD

Roy G. Jacobson, Rockford, Ill.

Application December 21, 1938, Serial No. 246,962

6 Claims. (Cl. 77—61)

This invention relates to machines for boring square or other irregularly shaped holes by relatively shifting a cutting tool and the work piece being bored in a transaxial direction and in timed relation to their relative rotation.

One object is to provide a machine of the above character in which the tool shifting mechanism is incorporated in a rotatable mounting so that the tool may operate on a stationary work piece.

The invention also resides in the novel character of the mechanism for shifting the cutting edge accurately and in proper synchronism with the relative rotation between the tool and the work.

Other objects and advantages of the invention will become apparent from the following detailed description taken in connection with the accompanying drawing, in which Figure 1 is a diametrical sectional view of a tool and its mounting embodying the novel features of the present invention.

Fig. 2 is an elevational view broken away to show a different position of the cutting edge.

Figs. 3 and 4 are sectional views taken respectively along the lines 3—3 and 4—4 of Fig. 1.

Fig. 5 is a view similar to Fig. 4 showing a different position of the cutting edge.

Fig. 6 is a fragmentary side elevational view of the tool proper.

Fig. 7 is a perspective view of the tool proper.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the form of the invention shown in the drawing, the invention is adapted for boring a squared hole 10 in a work piece 11 which has previously been drilled to form a round hole 12 the axis of which is coincident with the hole 10. Removal of metal to form the square hole is effected by a cutting tooth 13 projecting from a block 14 of cutting material. The latter is mounted to slide radially in an open ended recess 15 near one end of a tubular shank 16 which preferably is sized to fit snugly in the finished hole 10. To guide the tool accurately in its radial movement, grooves 17 are formed in the shank along the sides of the recess 15 and receive tongues 18 on opposite sides of the cutter block 14.

The upper end of the tubular shank is enlarged as indicated at 26 and secured by set screws 27 to a head 28 on the lower end of a tapered shank 29 which is coupled to a drive spindle 30. The latter is rotated and adapted to be fed axially as by rotation of a pinion (not shown) meshing with a rack 30a on the spindle mounting.

Means is provided for shifting the cutter block 14 positively in opposite directions. This means comprises inclined cam surfaces 19 and 20 converging toward each other and carried by a lug 21 upstanding from the cutter block. These surfaces coact with cam surfaces 22 on the lower ends of semicircular rods 23 and 24 disposed side by side within the shank 16 and adapted to slide longitudinally of the latter.

The cam rods are reciprocated relative to each other in timed relation to the rotation of the tool. To this end, the rods have enlarged upper ends 25 guided in the enlarged upper end 26 of the tube 16 and each end has a radial pin 31 projecting outwardly through a slot 32 in the sleeve. Rollers 33 on the outer ends of the pins 31 ride in cam grooves 34 and 35 formed by rings 36, 37 and 38 which encircle the sleeve 26 and are fastened by pins 39 to an outer sleeve 40. The latter is held between the head 28 and a shoulder 41 on the shank 16. To hold the cams against rotation, a stationary part 42 projects into a slot 43 in the sleeve. Herein, the slot extends a substantial distance parallel to the tool axis so as to hold the sleeve against rotation in all axial positions of the tool.

The cam grooves 34 and 35 are of identical shape and have alternate rises and falls, a rise of one groove coinciding with a fall of the other groove in the present instance. With such grooves and with the followers located on diametrically opposite sides of the tool axis, the rods 23 and 24 will be moved in unison and continuously in opposite directions so that the rod 24 will act on the surface 19 to cam the cutter block 14 outwardly while the rod 23 is being retracted to permit of such movement. Conversely, during retraction of the rod 24 and downward projection of the rod 23, the latter acts on the surface 20 to cam the block reversely and retract the cutting edge 13. The timing is such that at each point in the revolution of the tool, the edge 13a of the tooth 13 will fall on the periphery of the hole 10 to be formed. Thus, with the edge fully retracted as shown in Figs. 2 and 5, the rod 23 will be in advanced position and the edge will be operating on one side of the square. After a quarter of a revolution, the rods will be shifted to their opposite positions (Figs. 1 and 4), the cutting edge 13ª being projected to its outermost position and operating on one corner of the square hole. Where, as in the present instance, a square hole is to be formed, the tool 13 will be reciprocated back and forth, four times in each revolution.

To hold the tool accurately with respect to the axis of the hole being bored, the lower end 45 of the shank 16 is extended below the tool and the hole 12 is bored to receive the end 45 with a snug but sliding fit. As the tool is advanced into the work, the end is projected into the hole and is thus guided accurately by the work. Preferably, the end 45 is hollow and cut out as indicated at 46 immediately below the tool. The chips formed by the edge 13 may drop through the opening 46 and clear of the tool guide slot 15 thereby avoiding clogging of the slot.

To bore a square hole 10 with the present tool, the hole 12 is first drilled with its axis coincident with that of the hole to be formed. Then, the work piece 11 is mounted with the hole 12 accurately alined with the axis of the shank 16. As the rotating tool is fed downwardly, the projecting edge 13ª will take peripheral cuts along paths the shape of which is determined by the contour of the cam grooves. If a square hole is to be bored clear through the work piece, the shank 16 will, after the lower end 45 passes out of engagement with the work, coact with the side walls of the hole 10 and thus provide for accurate positioning of the tool while the final end of the hole is being bored.

It will be apparent that by varying the shape of the cam grooves, elliptical, rectangular, or any other desired shape of hole may be bored.

I claim as my invention:

1. A boring head having, in combination, a rotatable tube, a block carrying a cutting tooth and slidably supported by said tube for transaxial movement to change the position of the edge of said tooth, cam surfaces on said block converging toward each other, relatively reciprocable rods disposed side by side in said tube and respectively engaging said cam surfaces, and means for reciprocating said rods in timed relation to the rotation of said tube.

2. In a machine for boring a non-circular hole in a work piece, a tube, means supporting said tube and said work piece for relative rotation about the tube axis and for relative feeding movement along said axis, a block carrying a cutting tooth and supported by said tube for transaxial movement to vary the position of the edge of said tooth, cam surfaces on said block converging toward each other, relatively reciprocable rods within said tube respectively engaging said cam surfaces, and means for reciprocating said rods in timed relation to said relative rotation.

3. In a machine for boring a non-circular hole in a work piece, a tube, means supporting said tube and said work piece for relative rotation about the tube axis and for relative feeding movement along said axis, a block carrying a cutting tooth and supported by said tube for transaxial movement to vary the position of the edge of said tooth, cam surfaces on said block converging toward each other, relatively reciprocable rods within said tube respectively engaging said cam surfaces, followers projecting outwardly from the other ends of said rods through slots in said tube, and a non-rotatable sleeve encircling said tube and having cam grooves receiving the respective followers, said grooves being shaped to actuate said rods in timed relation to the rotation of said tube and cause said tooth to bore a hole of predetermined contour.

4. A boring head having, in combination, a rotatable member, a cutting tooth projecting from said member and slidably supported thereon for transaxial movement, rods carried by said member and relatively reciprocable longitudinally of the latter, means for reciprocating said rods in timed relation to the rotation of said member, and coacting cam means on said rods and said tooth respectively acting to shift the tooth positively in opposite directions.

5. A boring head having, in combination, a tube, a block carrying a cutting tooth and slidably transversely of said tube, reciprocable rods disposed side by side in said tube, cam means with said tooth engaging said block to shift said tooth inwardly and outwardly, and a lateral opening in said tube beyond said tooth coacting with the end of said tube to provide a chip receiving recess.

6. A boring head having, in combination, a rotatable member, a cutting tooth projecting from said member and slidably supported thereon for transaxial movement, rods carried by said member and relatively reciprocable longitudinally of the latter, coacting cam means on said rods and said tooth respectively acting to shift the tooth positively in opposite directions, followers on said rods, and a non-rotatable sleeve encircling said member and having cam grooves receiving the respective followers, said grooves being shaped to actuate said rods in timed relation to the rotation of said member and cause said tooth to bore a hole of predetermined contour.

ROY G. JACOBSON.